Dec. 26, 1967    N. G. KATSELIS    3,359,798
LIQUID LEVEL INDICATORS
Filed Feb. 8, 1965    4 Sheets-Sheet 1
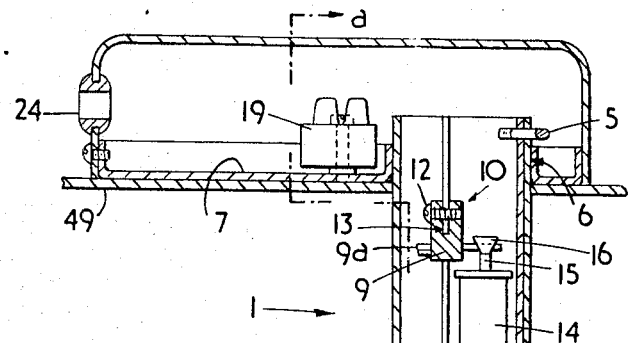
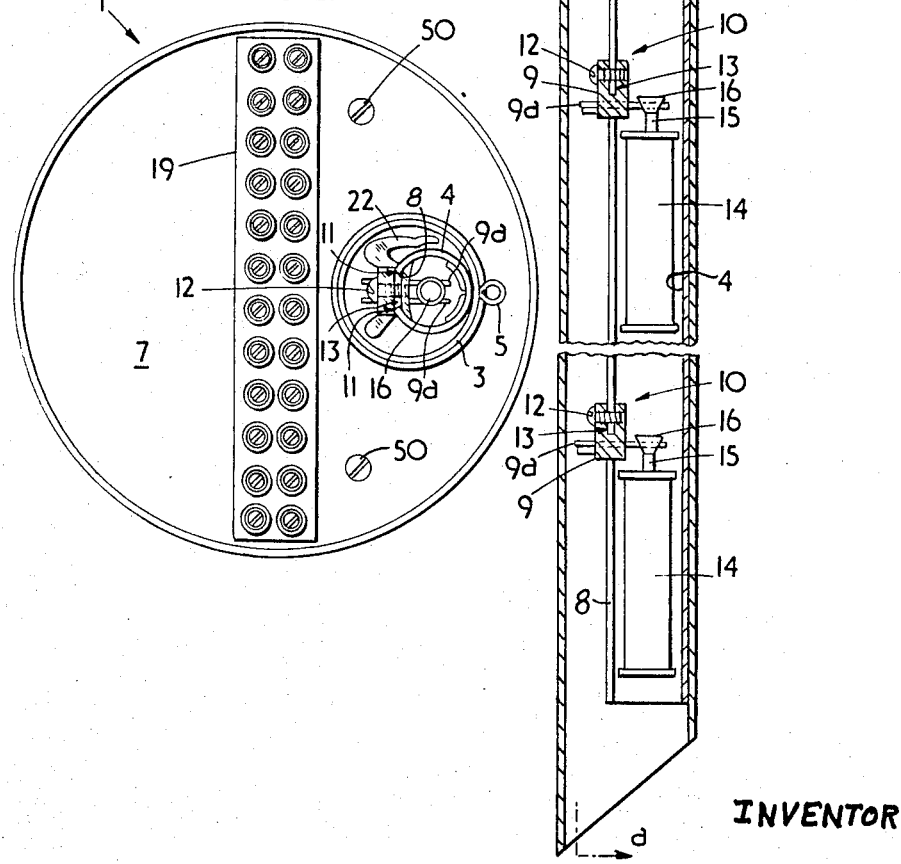
INVENTOR
NICHOLAS G. KATSELIS

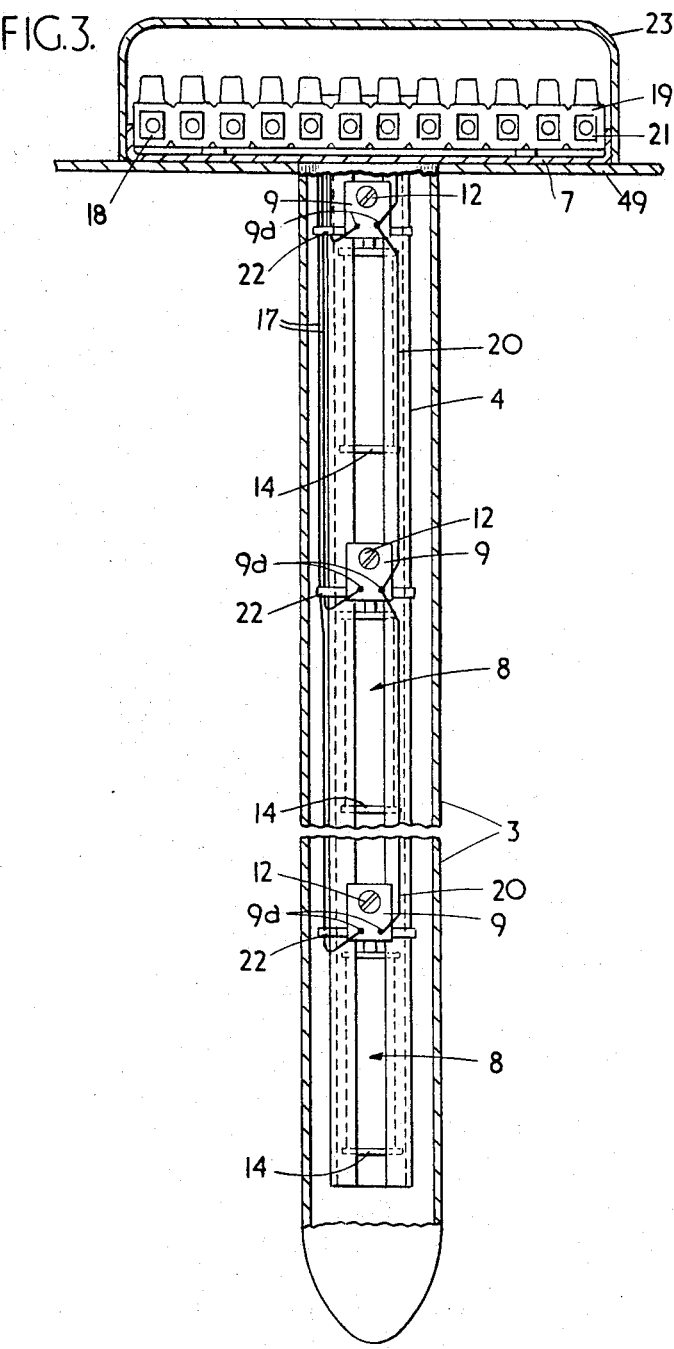

Dec. 26, 1967   N. G. KATSELIS   3,359,798
LIQUID LEVEL INDICATORS
Filed Feb. 8, 1965   4 Sheets-Sheet 3
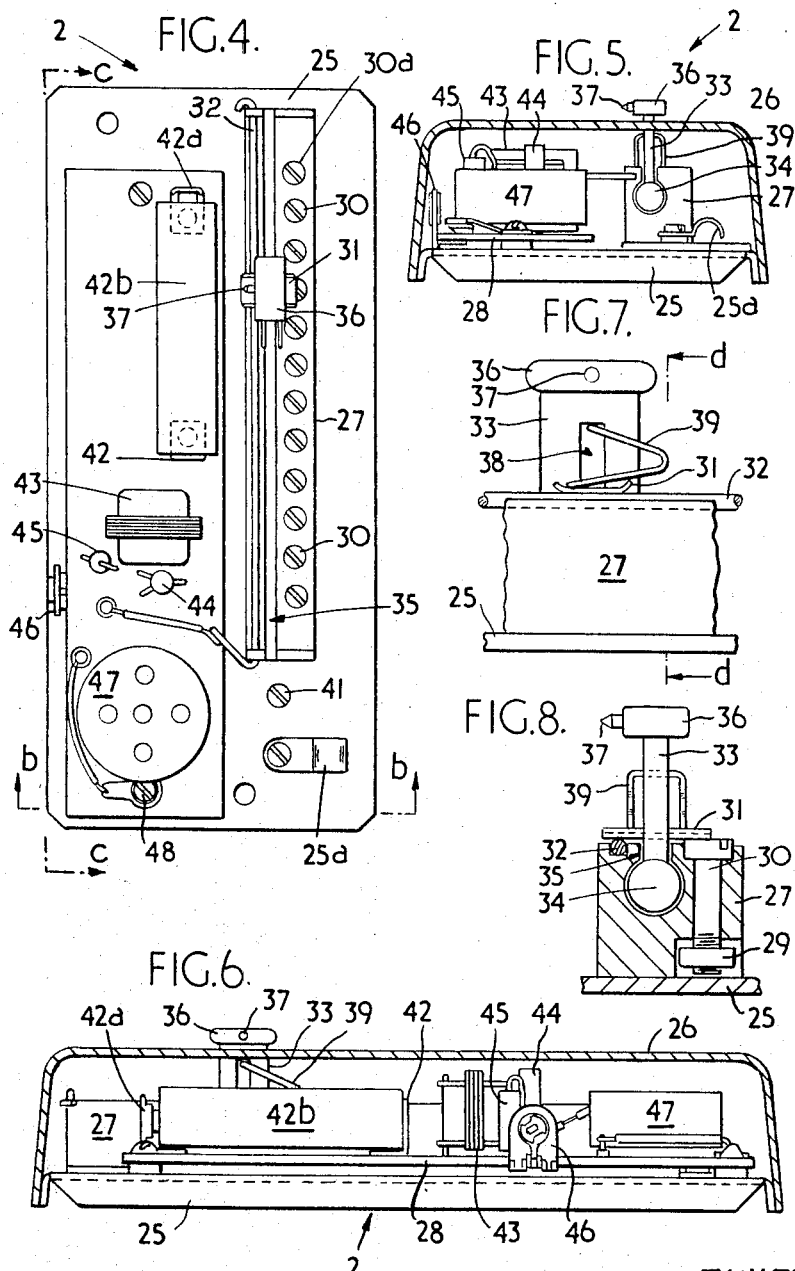
INVENTOR
NICHOLAS G. KATSELIS

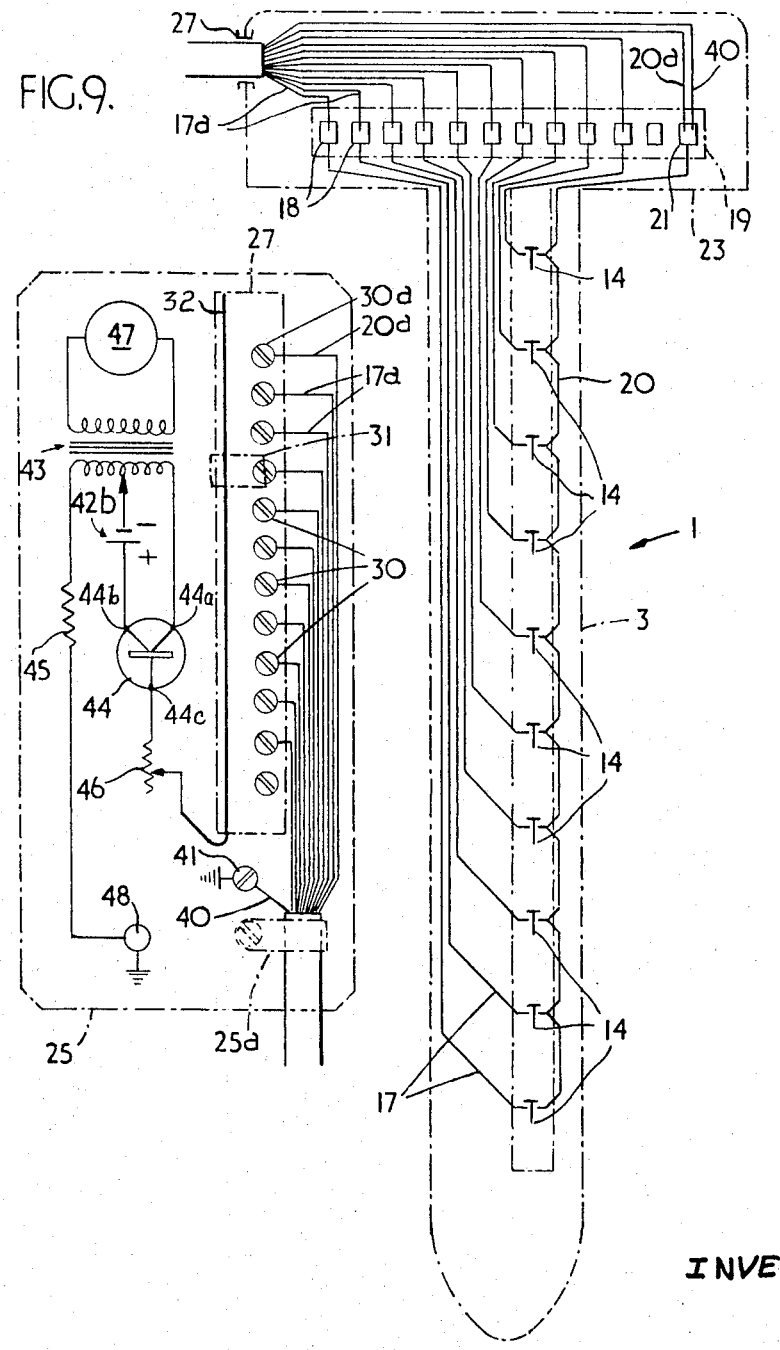

United States Patent Office 3,359,798
Patented Dec. 26, 1967

3,359,798
LIQUID LEVEL INDICATORS
Nicholas G. Katselis, Athens, Greece, assignor to Walker Crosweller & Company Limited, Clyde Crescent, Cheltenham, England
Filed Feb. 8, 1965, Ser. No. 430,842
5 Claims. (Cl. 73—308)

ABSTRACT OF THE DISCLOSURE

A probe carrying a plurality of individual float switches for projection into a liquid receptacle and a remote warning device having selectively closable switches connected with the float switches. When a float switch is closed and its corresponding warning switch is closed, an audible signal is generated indicating that the liquid level is at or below the corresponding float switch. An additional warning device switch is used to test the operativeness of the warning signal device.

---

A further object of the invention is to provide an electrically operated indicator which is of economical and compact construction and has minimum voltage and current ratings so that sparking at and wear of contacts is negligible and current consumption is reduced to a minimum thereby enabling a small dry battery to be employed as the source of current supply without necessitating frequent replacement of the battery.

In accordance with the said invention, a liquid level indicator comprises a level sensing probe adapted to be mounted in the top and to depend into the interior of a receptacle for the liquid and having a number of float switches spaced at intervals apart along its length. Each float switch is electrically connected to a corresponding one of a number of fixed contacts of a manually operated switch which is incorporated in a warning device located in a position remote from the receptacle. The moving contact is adapted to be displaced manually into electrical connection with each of the said fixed contacts in succession to enable the device to be operated when any one of the float switches is closed. The wiring contact of the manually operated switch is in electrical connection with the corresponding fixed contact.

Preferably the warning device comprises a signal generator which is coupled to a battery fed, audio frequency, transmitter oscillator by a transformer. The manually operated switch is adapted, in combination with any one of the float switches, to complete a triggering circuit for the oscillator, and the manually operated switch battery, transformer and oscillator are mounted within a common housing to the exterior of which the actuating member of the manually operated switch extends.

In order that the invention may more readily be understood and carrried into practice, reference will now be made to the accompanying drawings wherein:

FIG. 1 is a sectional elevation of the level sensing probe of a liquid level indicator.

FIG. 2 is a plan of the probe with the cover removed.

FIG. 3 is a section along the line a—a, FIG. 1.

FIG. 4 is a plan of the warning device of the indicator, with the cover removed.

FIGS. 5 and 6 are of FIG. 4, respectively, sections along the lines b—b and c—c, showing the cover in position.

FIG. 7 is an elevation, on a larger scale, of a constructional detail.

FIG. 8 is a section along the line d—d, FIG. 6, and FIG. 9 is a wiring diagram.

The indicator shown in the drawings comprises a level sensing probe 1 (FIG. 1), which, when the indicator is installed in position, is fitted into the top of a liquid storage tank or like receptacle and depends downwardly of the interior to, or to the vicinity of, the bottom of the receptacle. A warning device 2 (FIG. 4) is mounted upon a wall or equivalent support located at any desired distance from the receptacle. For example, the probe may be fitted in the oil storage tank of an oil-fired central heating installation of a private dwelling house or other building, in which case, the warning device may be mounted on any suitable support within the building so that it is readily accessible for operation by any of the occupants.

The probe (see FIGS. 1–3) comprises two open-ended tubes 3, 4 of different diameters, the smaller diameter tube 4 being detachably secured within and eccentrically of the larger diameter tube 3 by a split pin 5 so that the tube 4 is located wholly within, extends lengthwise of and makes a line contact with the internal surface of the tube 3. One end of the larger diameter tube 3 extends through an eccentric hole 6 in a circular base plate 7 and is secured thereat to the plate 7. Diametrically opposite to its line contact with the larger diameter tube the smaller diameter tube is formed with a longitudinal slot 8.

The bases 9 of any desired number of float switches 10 are disposed and clamped in the slot so that the switches are pitched equidistantly apart along the length of the probe. Each switch base 9 is wider than the slot 8 and is assembled in the tube 4 by slidably engaging the opposite edges of the slot in complementary longitudinal grooves 11 in the lateral edges of the base. After the base has been slid along the slot to a predetermined position lengthwise of the tube, it is clamped to the slot edges by tightening a screw 12 which extends through a transverse slot 13 in one end of the base.

Between the screw 12 and the opposite end of each switch base 9, each of a parallel pair of fixed contact pins 9a located at right angles to the longitudinal grooves 11, extends through, is secured within, and projects beyond the opposite sides of the base to the interior and exterior of the smaller diameter tube.

Internally of the smaller diameter tube, a hollow and non-metallic, cylindrical float 14 is suspended from the pins of each switch base by a stud 15 which projects from and concentrically of the upper end of the float. Each stud is of a diameter less than the width of the clearance between the pins, and is provided on its free end with an inverted frusto-conical metal head 16. The stud head has a maximum diameter greater than the width of the clearance so that it is adapted to be supported by and between the pins and, when so supported, to connect the pins together electrically.

A plurality of flexible conductors 17, equal to the number of float switches, connect one pin 9a of each pair to a corresponding terminal 18 in a terminal block 19 mounted upon and extending diametrically of the base plate 7. A common flexible conductor 20 connects all of the other pins 9a of each of the several pairs to the terminal 21 in one end of the block 19. As the conductors 17 reach upwardly within the probe, they are grouped together against the external surface of the tube 4 by legs 22 provided on the bases 9 of the several float switches.

A cover 23 is assembled to the base plate 7 and is provided with a rubber or like grommet 24 fitted in its wall on the opposite side of the terminal block to the tubes 3, 4 and a number of additional insulated flexible conductors 17a (see FIG. 9) equal to the number of float switches and extending through the grommet, are connected respectively to the terminals to which the conductors 17 are connected. A further flexible conductor 20a also extends through the grommet and is connected to the same terminal 21 as the common conductor 20.

The warning device 2 (see FIGS. 4–5) comprises a rectangular base plate 25 to which a cover 26 is assembled. Internally of the cover, a terminal block 27 and a rectangular board 28 are mounted side by side upon, and insulated from, the plate 25.

A row of terminals 29 (of which one is shown in FIG. 8) is assembled in the underside of the block 27 by screws 30, 30a. The heads of screws 30, 30a stand proud of the upper surface of the block and each of the conductors 17a extending through the grommet 24 reaches to and extends into the interior of the cover 26 where it is connected to a corresponding one of the terminals 29. The conductor 20a as connected to the terminal 29 which is assembled in the block 27 by the screw 30a at one end of the row. The conductors are clamped against the base plate 25 by a grip 25a mounted upon the said plate (FIG. 4).

The terminal block 27 also serves as a base of a manually operated switch for which the heads of the screws 30, 30a serve as fixed contacts. The moving contact consists of a copper strip 31 which serves to selectively connect the screw heads to a copper wire contact 32 extending longitudinally of the block parallel to the row of screws.

The actuating member of the manually operated switch comprises a pillar 33 having (see FIGS. 7 and 8) a cylindrical foot 34 which is retained in, but is slidable lengthwise of, a longitudinal groove 35 formed in and opening to the upper surface of the said block. The pillar extends to the exterior of the cover through a slot (not shown) in the top of the cover 26, and its outer end is formed with a finger piece 36 having a pointer 37 on one of its lateral edges. A longitudinal slot 38 is formed in the pillar between the foot and finger piece. The moving contact strip 31 extends through the slot and is urged towards the upper surface of the terminal block by a spring 39.

One end of an additional flexible conductor 40 (see FIG. 9) is connected to an earth terminal 41 provided on the base plate 25.

A pair of terminals 42, 42a for a dry battery 42b, a transformer 43, a transistor 44, a fixed resistance 45, a variable resistance 46, and a crystal insert or like audio signal generator 47 are mounted upon the board 28. Mainly by a circuit printed upon the underside of the board, the signal generator is connected across the secondary winding of the transformer. The primary winding of the transformer is connected in the emitter circuit of the transistor by connecting one end of the winding to the transistor emitter 44a and connecting the battery between a primary winding top and the transistor collector 44b. The other end of the primary winding is connected to the transistor base 44c through a normally open limiting resistance network comprising the fixed resistance 45, a second earth terminal 48 mounted on the plate 25, earth terminal 41, fixed contacts 30, 30a, moving contact strip 31, fixed contact wire 32 and variable resistance 46 so that the other part of the primary winding is included in a feed back circuit to the said transistor base.

To install the indicator, the tubes 3, 4 are inserted through a hole in the top 49 of an oil storage tank or other liquid storage receptatcle until the base plate 7 of the probe seats upon the said top and the larger diameter tube 3 reaches to, or to the vicinity of, the bottom of the receptacle, whereupon the plate is secured to the top by screws 50. The base plate of the warning device is mounted upon any convenient support which may be located at any distance from the tank and the requisite electrical connections are made.

When the level of liquid in the receptacle is below the lowermost float switch, the heads 16 of all the floats 14 are supported upon and effect electrical connection between their respective pairs of contact pins 9a, and, consequently, all the float switches are closed, As the liquid level rises, the floats are submerged in succession and, due to their buoyance, rise within the smaller diameter tube thereby lifting the heads 16 and opening the float switches.

Normally, the actuating pillar 33 of the manually operated switch is located beyond the end of the row of fixed contacts 30 remote from the contact 30a so that the switch is open. However, by sliding the pillar along the groove 35 towards the said contact 30a, the moving contact strip 31 rides on to and makes an electrical connection with each of the contacts 30 in succession, thereby closing the manually operated switch and when the corresponding float switch is also closed due to its float being above liquid level, the feed back circuit of the warning device is completed. The completion of the feed back circuit applies a small forward bias to the transistor 44 which is thereby brought into its active condition and caused to function, in known manner, as a transistor oscillator. On the transistor becoming active, a small voltage change occurs in the primary winding in the sense to increase the positive feed back voltage and thereby increase the transistor base current. This effect is cumulative until the transistor saturates, with most of the supply voltage dropped across the primary winding. The transistor switches off, so that the circuit returns to the initial condition, corresponding to the original completion of the feed back circuit, and the cycle is repeated so long as the feed back circuit is closed. The repeated cycles set up an oscillatory voltage across the secondary winding of the transformer to drive the crystal insert and create and audio tone which persists for as long as the moving contact strip remains in electrical connection with the fixed contact 30 on to which it has been moved and the corresponding float switch remains closed.

Therefore, it will be appreciated that, by sliding the pillar 33 along the groove 35 towards the fixed contact 30a, an indication of the liquid level in the receptacle is given as soon as an audio tone is created by the crystal insert. To given a visual indication of the level, a system of graduations is marked upon the external surface of the cover 26 alongside the slot in the said cover through which the pillar projects, each graduation being in register with a corresponding one of the fixed contacts 30 and the pointer 37 being so located on the finger piece 36 that it registers with one of the graduations when the moving contact strip is in electrical connection with the corresponding fixed contact.

Should no audio tone be emitted by moving the contact strip 31 into electrical connection any of the fixed contacts 30 the warning device may be tested by sliding the pillar along the slot 35 until the strip 31 makes electrical connection with the contact 30a to complete the circuit of the warning device through the conductor 20a, terminal 21 and conductor 40.

By, for example, providing a secondary D.C. resistance of 126 ohms, arranging the primary tapping to create a D.C. resistance of 4 ohms in the collector circuit and a D.C. resistance of 2.5 ohms in the feed back circuit, providing a fixed resistance 45 of 220 ohms, a variable resistance 46 of 2,000 ohms, a 1.5 volt battery and a crystal insert 47 having a D.C. resistance of not less than 3 megohms, the output signal created may have an oscillation frequency within the range of 800–5000 cycles per second, the frequency being variable by adjustment of the variable resistance to increase or decrease the rate at which the bias builds up on the base of the transistor and the transistor reaches the saturated condition.

Since the current consumption of the warning device is low, for example less than 0.0004 ma. in the off state of the transistor and not more than 15 ma. or thereabouts in the on state of the transistor, the battery 42b has a long useful life.

I claim:
1. A liquid level indicator comprising in combination, a level sensing probe adapted to be mounted on a receptacle for liquid in depending relation thereinto, a plurality of float switches disposed in vertically spaced relation on said probe,
a float member for closing each of said switches,
a warning device located remotely from said probe and having a plurality of indicating switch contacts corresponding to said float switches, a movable contact member for selectively completing a circuit through any one of said indicating switch contacts, an indicating device actuated in response to closed condition of one of said float switches and the activation of the corresponding indicating switch contact, and a test contact for activation by said movable contact member to test the operativeness of said indicating device.

2. A liquid level indicator as defined in claim 1 wherein said indicating switch contacts are disposed in a row and said movable contact member is displaceable along a path parrallel to said row to enable the movable contact member to be moved into successive electrical connection with said indicating switch contacts.

3. A liquid level indicator comprising, in combination,
a level sensing probe adapted to be mounted on a receptacle for liquid in depending relation thereto,
a plurality of float switches disposed in vertically spaced relation on said probe,
a float member for closing each of said switches,
a warning device located remotely from said probe and having a plurality of indicating switch contacts corresponding to said float switches, a movable contact member for selectively completing a circuit through any one of said indicating switch contacts, an indicating device actuated in response to closed condition of one of said float switches and the activation of the corresponding indicating switch contact,
each float switch comprising a pair of spaced contacts, a float body of electrically insulated material below said spaced contacts, a stud upstanding from the float body having a width less than the spacing between the pair of spaced contacts, and an electrically conductive head at the upper end of the stud having a width greater than the spacing between said pair of spaced contacts,
said probe including a tube within which said float bodies are confined.

4. A liquid level indicator as defined in claim 3 wherein said tube is provided with a longitudinal slot, each pair of said spaced contacts being carried by an insulating block received in and selectively positioned longitudinally of said tube in said slot.

5. A liquid level indicator according to claim 3 wherein said warning device comprises a signal generator, a transistorized audio-frequency generator, and a transformer coupling said audio-frequency generator to said signal generator.

References Cited

UNITED STATES PATENTS

| | | | |
|---|---|---|---|
| 705,421 | 7/1902 | Moore | 340—244 |
| 1,617,287 | 2/1927 | Huggins | 73—290.1 |
| 1,831,898 | 11/1931 | Wignall | 200—384 |
| 2,977,418 | 3/1961 | Haas | 340—384 |

LOUIS R. PRINCE, *Primary Examiner.*

DAVID SCHONBERG, *Examiner.*

D. M. YASICH, *Assistant Examiner.*